United States Patent [19]

Takigawa et al.

[11] Patent Number: 4,481,992

[45] Date of Patent: Nov. 13, 1984

[54] HEAVY DUTY RADIAL TIRE

[75] Inventors: Hiroyoshi Takigawa, Kodaira; Hiroshi Ogawa, Higashiyamato, both of Japan

[73] Assignee: Bridgestone Tire Company Limited, Tokyo, Japan

[21] Appl. No.: 466,385

[22] Filed: Feb. 14, 1983

Related U.S. Application Data

[63] Continuation of Ser. No. 268,519, May 29, 1981, abandoned.

[30] Foreign Application Priority Data

Jun. 10, 1980 [JP] Japan .................................. 55-77084

[51] Int. Cl.³ ............................................ B60C 11/06
[52] U.S. Cl. .............................. 152/209 R; D12/142
[58] Field of Search ........... 152/209 R, 209 A, 209 B, 152/209 NT, 209 WT, 209 D; D12/143–145, 142

[56] References Cited

U.S. PATENT DOCUMENTS

| D. 121,176 | 6/1940 | Anderson | D12/142 |
|---|---|---|---|
| 1,956,011 | 4/1934 | Evans | 152/209 R |
| 3,405,753 | 10/1968 | Verdier | 152/209 R |
| 4,271,885 | 6/1981 | Takigawa et al. | 152/209 R |

Primary Examiner—Lois E. Boland
Attorney, Agent, or Firm—Sughrue, Mion, Zinn, Macpeak and Seas

[57] ABSTRACT

A heavy duty radial tire having a tread of a double zigzag pattern, wherein the main groove is formed into a zigzag and further the ridge of a rib adjacent to the zigzag main groove is formed into a zigzag, whose pitch and amplitude are considerably smaller than those of the zigzag main groove, has a high irregular wear resistance without deteriorating the wet performance of the tire.

4 Claims, 2 Drawing Figures

HEAVY DUTY RADIAL TIRE

This is a continuation of application Ser. No. 268,519, filed May 29, 1981 (now abandoned).

BACKGROUND OF THE INVENTION (1) Field of the Invention

The present invention relates to a heavy duty radial tire. In particular, it relates to a heavy duty radial tire having an improved tread pattern, which can prevent irregular wear without deteriorating the wet-resistant property of the tire and is suitable for running the tire for a long period of time.

(2) Description of the Prior Art

A known pneumatic radial tire comprising a tread and a rigid reinforcing structure just under the tread, the reinforcing structure consisting of a carcass which consists of at least one ply having cords arranged therein in the substantial radial plane of the tire, and a belt which consists of at least two cord layers arranged on the outer side of the carcass so as to be crossed with each other at a relatively small angle with respect to the equatorial line of the tire. The tread has at least one zigzag main groove which extends continuously or intermittently on the tread along its circumferential direction, and having continuous or intermittent tread convexes or ribs defined by the zigzag main groove and positioned adjacently to the main groove. However, the pneumatic radial tire causes sometimes irregular wear when the tire is fitted to heavy vehicles, such as truck and bus, and run under a heavy load. The reason is that, as specifically explained in the copending U.S. patent application No. 896,425 by the present inventors, now, U.S. Pat. No. 4,271,885 wear which occurs at the top A of a rib 2 adjacent to main groove 1 in FIG. 1 grows gradually and extends towards the concave corner B of the rib 2, resulting in a stepwise irregular wear along the edge of the rib. This irregular wear is generally called railway wear.

In order to overcome this drawback, the above described U.S. patent has proposed a tread pattern, wherein the amplitude W and pitch P of a zigzag main groove extending on a tread T along its circumferential direction are limited to specifically limited values considerably smaller than commonly used values. Although, this tread pattern is remarkably effective for preventing the above described irregular wear, the pattern deteriorates somewhat tire performance at the same time.

This drawback is specifically the deterioration of traction braking performance under severe use conditions, particularly on wet roads (traction braking performance on wet road is referred to as wet performance hereinafter). This wet performance is no problem under ordinary conditions, but can not be ignored when a heavy duty tire is used under severe conditions.

SUMMARY OF THE INVENTION

The object of the present invention is to provide a pneumatic radial tire which has a tread pattern for preventing effectively irregular wear without deteriorating the wet performance of the tire, and is suitable to be used under severe conditions.

The inventors have made various investigations with respect to the tread pattern which is effective for preventing irregular wear without deteriorating wet performance, and found out that a double zigzag pattern which will be explained later in this specification is effective.

That is, a feature of the present invention lies in a heavy duty radial tire comprising a tread and a rigid reinforcing structure just under the tread with the reinforcing structure having a carcass which consists of at least one ply having cords arranged therein in the substantial radial plane of the tire, and a belt which consists of at least two cord layers arranged on the outer side of the carcass so as to be crossed with each other at a relatively small angle with respect to the equatorial line of the tire. The tread has at least one zigzag main groove extending continuously or intermittently on the tread along its circumferential direction. Specifically, the invention comprises a zigzag being formed in at least one of ridges themselves defining the tread convex or rib positioned adjacently to the main groove and extending continuously or intermittently, the pitch and amplitude of said zigzag ridge being considerably smaller than those of the zigzag main groove.

In the heavy duty radial tire of the present invention, the pitch and amplitude of the zigzag ridge are preferably within the ranges of 1/10~1/5 times and 1/10~1/2 times of the pitch and amplitude of the zigzag main groove, respectively.

DESCRIPTION OF THE PREFERRED EMBODIMENT

In the present invention, the main groove is formed into a zigzag having large pitch P and amplitude W enough to satisfy the demand for obtaining a satisfactorily high wet performance, and in order to prevent the irregular wear due to the large zigzag pitch and amplitude, a zigzag having a pitch p and amplitude w, which are smaller than the pitch and amplitude of the zigzag main groove, is formed in the ridge of the tread convex or rib positioned adjacent to the main groove.

Figure 2:
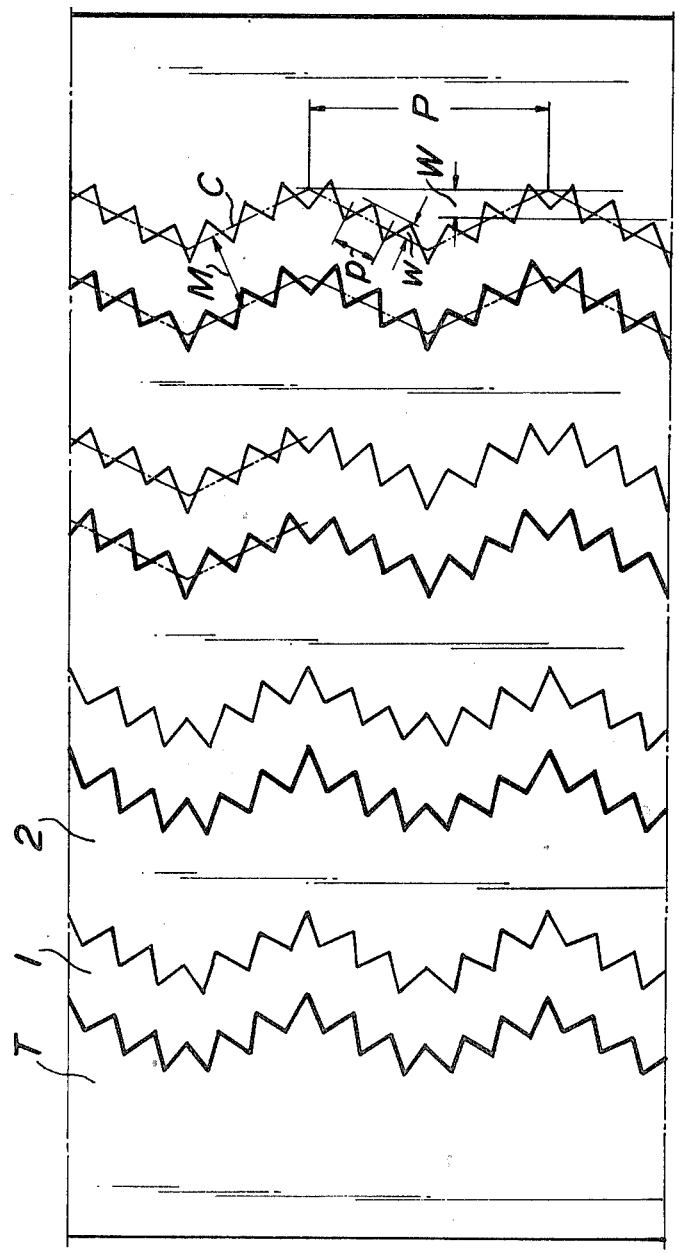
FIG. 2 is a partial development view of a tread having the tread pattern for preventing irregular wear in the present invention.

FIG. 2 illustrates one example of the novel tread patterns of the present invention. In FIG. 2, the reference T represents a tread, the numeral 1 represents a main groove and the numeral 2 represents a rib.

In the rib-type tread pattern shown in FIG. 2, four main grooves 1 are formed on the tread of a tire having a size of 10.00 R20 14PR to divide the tread width into five equal widths and to form five substantially equal ribs 2.

The main groove 1 is formed into a zigzag such that its basic form has a pitch P of 40 mm and an amplitude W of 5 mm as shown by an imaginary line C in FIG. 2 in order to obtain satisfactory wet performance, and the ridge of the rib 2 is formed into a zigzag smaller than the zigzag of the main groove 1 itself in order to prevent the irregular wear which occurs inevitably due to the above described zigzag pattern of the main groove. When a zigzag having a pitch p of 4~8 mm and an amplitude w of 0.5~2.5 mm was formed in the ridge of the rib 2 defining the above described zigzag main groove, good results were obtained.

In the above described example, the main groove 1 had an average width M of 10 mm.

Figure 1:
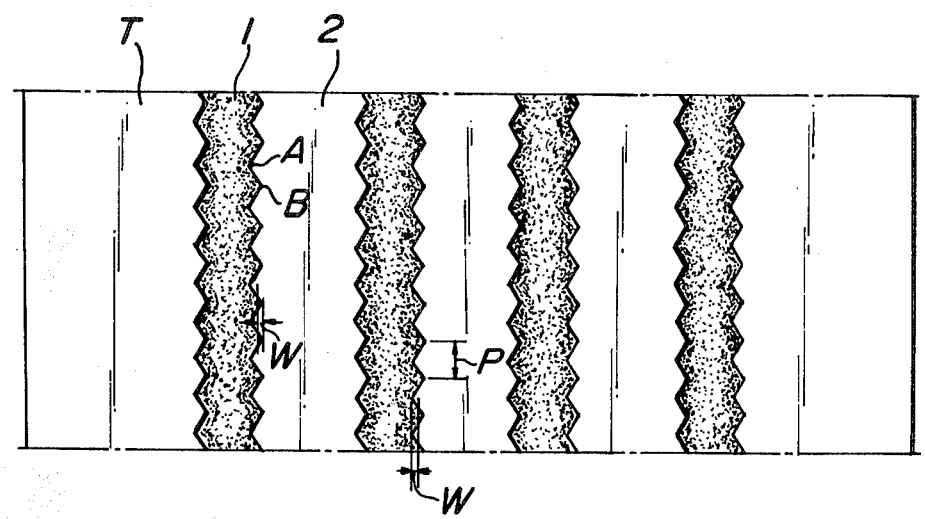
FIG. 1 is a partial development view of a tread having a conventional tread pattern for preventing irregular wear, which has been explained hereinbefore in this specification.

The above described tire of the present invention is referred to as sample tire A in Table 1 below; a tire disclosed in U.S. Pat. No. 4,271,885 and shown in FIG. 1, whose zigzag groove had a pitch of 10 mm and an amplitude of 1.25 mm, is referred to as sample tire B (comparative tire); and a tire wherein only the main groove was formed into a zigzag having a pitch of 40 mm and an amplitude of 5 mm, is referred to as sample tire C (comparative tire). Those tires were compared with each other with respect to the traction performance, braking performance and irregular wear resistance under the same condition in the reinforcing structure of tire, the composition of tread rubber and other factors.

The results are shown in the following Table 1.

TABLE 1

| Sample tire | Traction performance | Braking performance index | Irregular wear resistance index |
|---|---|---|---|
| A | ⊙⊙ | 103 | 138 |
| B | 0 | 95 | 140 |
| C | ⊙⊙ | 100 | 100 |

Note:
⊙⊙ good
0 somewhat poor under a severe condition

The test conditions in the above Table 1 are as follows.

(1) Braking performance index

A test car (plain body truck) fitted with a sample tire was run at a variant speed of 40, 60, 80 or 100 km/hr under a 100% load and a normal internal pressure, and the braking distance of the sample tire was measured. The braking performance index of a sample tire is shown by the reciprocal of the ratio of the braking distance of the sample tire to that of sample tire C, which is indicated by an index 100.

(2) Irregular wear resistance index

After a test car fitted with a sample tire was run on a test road, which comprises a highway and an ordinary road in a ratio of 7:3, over a distance of 100,000 km under a 100% load and a normal internal pressure, and the amount of irregular wear in the sample tire was measured. The irregular wear resistance index of a sample tire is shown by the reciprocal of the ratio of the amount of irregular wear of the sample tire to that of irregular wear of sample tire C, which is indicated by an index 100.

As described above, according to the present invention, irregular wear of so-called railway wear can be effectively prevented without deteriorating the wet performance, such as the traction performance and braking performance on wet road.

What is claimed is:

1. A heavy duty radial tire comprising: a tread and a rigid reinforcing structure just under the tread, said reinforcing structure comprising a carcass having at least one ply having cords arranged therein in the substantial radial plane of the tire, and a belt comprising at least two cord layers arranged on the outer side of the carcass so as to be crossed with each other at a relatively small angle with respect to the equatorial line of the tire, and said tread having a complete rib-type tread pattern with at least one zigzag main groove extending continuously on the tread along its circumferential direction and at least two zigzag ribs separated from each other in the lateral direction by the main groove and adjacent thereto and extending continuously on the tread along its circumferential direction; a zigzag being formed in both ridges of a set of ridges themselves defining one of said zigzag ribs positioned adjacent the main groove; the zigzag of said zigzag ridges being continuous along the circumferential direction of the tread, and a pitch and an amplitude of said zigzag in said ridge being constant along the circumferential direction of the tread and being 1/10–1/5 times and 1/10–½ times the pitch and amplitude of the zigzag of said main groove, respectively.

2. A tire according to claim 1, wherein ridges at both sides of at least one main groove have a zigzag form.

3. A tire according to claim 1, wherein ridges at both sides of all main grooves have a zigzag form.

4. A tire according to claim 3, wherein the tread has four main grooves.

* * * * *